United States Patent
Mohan et al.

(10) Patent No.: US 9,706,451 B2
(45) Date of Patent: Jul. 11, 2017

(54) METHOD AND APPARATUS FOR PRE-CONFIGURING FOR A SERVING CELL CHANGE TO NEIGHBOR CELLS

(71) Applicant: QUALCOMM Incorporated, San Diego, CA (US)

(72) Inventors: Siddharth Mohan, San Diego, CA (US); Rohit Kapoor, San Diego, CA (US); Haitong Sun, San Diego, CA (US); Sharad Deepak Sambhwani, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 165 days.

(21) Appl. No.: 14/023,142

(22) Filed: Sep. 10, 2013

(65) Prior Publication Data

US 2014/0128080 A1    May 8, 2014

Related U.S. Application Data

(60) Provisional application No. 61/723,631, filed on Nov. 7, 2012.

(51) Int. Cl.
*H04W 36/30*      (2009.01)
*H04W 36/00*      (2009.01)

(52) U.S. Cl.
CPC .............. *H04W 36/0061* (2013.01)

(58) Field of Classification Search
CPC ..... H04W 24/10; H04W 36/00; H04W 72/04; H04W 24/00; H04W 84/00; H04W 36/0061; H04L 12/26; H04L 12/28
(Continued)

(56) References Cited

U.S. PATENT DOCUMENTS

2006/0293055 A1    12/2006    Pirskanen
2008/0188224 A1    8/2008    Pani et al.
(Continued)

FOREIGN PATENT DOCUMENTS

WO    WO-2009/155480 A1    12/2009

OTHER PUBLICATIONS

Ericsson: "HS-PDSCH Serving Cell Change Enhancements", 3GPP Draft, R1-080911, 3rd Generation Partnership Project (3GPP), Mobile Competence Centre, 650, Route Des Lucioles ; F-06921 Sophia Antipolis Cedex ; France, vol. RAN WG1, no. Sorrento, Italy; Feb. 6, 2008, Feb. 6, 2008 (Feb. 6, 2008), pp. 1-3, XP050109385, [retrieved on Feb. 6, 2008].
(Continued)

*Primary Examiner* — Kashif Siddiqui
(74) *Attorney, Agent, or Firm* — Ashish L. Patel

(57) ABSTRACT

Aspects related to pre-configuring for a serving cell change to neighbor cells are described. In one example, a user equipment (UE) may camp on a first cell. The UE may receive at least one communication including target cell pre-configuration information for one or more neighbor cells eligible for pre-configuration. The UE may determine that the first cell is no longer providing adequate service and identify a target cell, which may be one of the one or more neighbor cells, but is not part of an active set for the UE. The UE may transmit a message (e.g., Event 1d) requesting a serving cell change to the target cell. The UE may configure to receive service from the target cell based on the pre-configuration information associated with the target cell. The UE may receive an indication to perform the serving cell change and perform the serving cell change.

17 Claims, 10 Drawing Sheets

(58) Field of Classification Search
USPC ....... 455/436, 437, 438, 439, 440, 441, 442, 455/443, 444, 525; 370/331, 332
See application file for complete search history.

(56) References Cited

U.S. PATENT DOCUMENTS

| | | | |
|---|---|---|---|
| 2009/0196259 A1* | 8/2009 | Pani .................... | H04W 36/30 370/332 |
| 2009/0245203 A1* | 10/2009 | Pani .................... | H04W 36/30 370/331 |
| 2009/0275319 A1 | 11/2009 | Aoyama et al. | |
| 2011/0044292 A1* | 2/2011 | Eravelli et al. ............... | 370/332 |
| 2012/0002637 A1* | 1/2012 | Adjakple et al. ............. | 370/331 |
| 2012/0076021 A1* | 3/2012 | Sambhwani ...... | H04W 36/0072 370/252 |
| 2012/0113797 A1 | 5/2012 | De Pasquale et al. | |
| 2012/0176891 A1 | 7/2012 | Chin et al. | |
| 2012/0236776 A1* | 9/2012 | Zhang .................. | H04W 48/12 370/312 |
| 2012/0281544 A1* | 11/2012 | Anepu ................. | H04B 7/0632 370/241 |
| 2013/0295946 A1* | 11/2013 | Panchal et al. ............ | 455/452.1 |

OTHER PUBLICATIONS

Interdigital, "HS-DSCH Serving Cell Change Enhancements," 3GPP TSG-RAN WG2#62, XP050140199, Kansas City, May 5-9, 2008, pp. 1-2.

International Search Report and Written Opinion issued in Application No. PCT/US2013/059233, mailed Jan. 21, 2014, 13 pages.

QUALCOMM, "Enhanced HSDPA Mobility Performance: Quality and Robustness for VOIP Service", XP002631789, Feb. 18, 2009, pp. 1-16, retrieved from the Internet: URL:http://www.qualcomm.com/common/documents/white_papers/ESCC_White_Paper-v4.pdf [retrieved on Apr. 6, 2011].

* cited by examiner

METHOD AND APPARATUS FOR PRE-CONFIGURING FOR A SERVING CELL CHANGE TO NEIGHBOR CELLS

CLAIM OF PRIORITY UNDER 35 U.S.C. §119

The present application for patent claims priority to Provisional Application No. 61/723,631 entitled "METHOD AND SYSTEM FOR PRE-CONFIGURING A WIRELESS TERMINAL FOR A SERVING CELL CHANGE TO NEIGHBOR CELLS" filed Nov. 7, 2012, and assigned to the assignee hereof and hereby expressly incorporated by reference herein.

BACKGROUND

Field

Aspects of the present disclosure relate generally to wireless communication systems, and more particularly, to method and system for pre-configuring for a serving cell change to neighbor cells.

Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). UMTS also supports enhanced 3G data communications protocols, such as High Speed Packet Access (HSPA), which provides higher data transfer speeds and capacity to associated UMTS networks.

As the demand for mobile broadband access continues to increase, research and development continue to advance the UMTS technologies not only to meet the growing demand for mobile broadband access, but to advance and enhance the user experience with mobile communications. For example, heterogeneous networks have recently been an area of intense interest due to their promise of improved wireless coverage in otherwise difficult-to-cover areas like train stations, tunnels, office buildings, and homes. A heterogeneous network includes conventional high-power macro-cells, as well as various low-power nodes such as micro-cells, pico-cells, and femto-cells, with varying capacities, coverage areas, and power capabilities. However, with such a deployment where different base stations have different power levels, a number of issues can arise relating to serving cell changes between cells having large differences in downlink transmission power, such as call drops resulting from failed serving cell change procedures.

Thus, enhancements to existing serving cell change procedures are desired.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In an aspect, a method of pre-configuring a user equipment (UE) for a serving cell change is described. The method may include camping on a first cell. The method may include receiving at least one communication including target cell pre-configuration information for one or more neighbor cells eligible for pre-configuration. The method may include determining that the first cell is no longer providing adequate service. The method may include identifying a target cell that can provide adequate service. The target cell may be one of the one or more neighbor cells eligible for pre-configuration and is not part of an active set associated with the user equipment. The method may include transmitting a message requesting a serving cell change from the first cell to the target cell. The message may be an Event 1d message. The method may include configuring to receive service from the target cell based on the pre-configuration information associated with the target cell. The method may include receiving an indication to perform a serving cell change to the target cell. The method may include performing the serving cell change to the target cell.

In an aspect, a computer program product for pre-configuring a user equipment (UE) for a serving cell change may include a computer-readable medium including code. The code may cause a computer to camp on a first cell. The code may cause a computer to receive at least one communication including target cell pre-configuration information for one or more neighbor cells eligible for pre-configuration. The code may cause a computer to determine that the first cell is no longer providing adequate service. The code may cause a computer to identify a target cell that can provide adequate service. The target cell may be one of the one or more neighbor cells eligible for pre-configuration and is not part of an active set associated with the user equipment. The code may cause a computer to transmit a message requesting a serving cell change from the first cell to the target cell. The message may be an Event 1d message. The code may cause a computer to configure to receive service from the target cell based on the pre-configuration information associated with the target cell. The code may cause a computer to receive an indication to perform a serving cell change to the target cell. The code may cause a computer to perform the serving cell change to the target cell.

In an aspect, an apparatus for pre-configuring a user equipment (UE) for a serving cell change is described. The apparatus may include means for camping on a first cell. The apparatus may include means for receiving at least one communication including target cell pre-configuration information for one or more neighbor cells eligible for pre-configuration. The apparatus may include means for determining that the first cell is no longer providing adequate service. The apparatus may include means for identifying a target cell that can provide adequate service. The target cell may be one of the one or more neighbor cells eligible for pre-configuration and is not part of an active set associated with the user equipment. The apparatus may include means for transmitting a message requesting a serving cell change from the first cell to the target cell. The message may be an Event 1d message. The apparatus may include means for configuring to receive service from the target cell based on the pre-configuration information associated with the target cell. The apparatus may include means for receiving an indication to perform a serving cell change to the target cell. The apparatus may include means for performing the serving cell change to the target cell.

In an aspect, an apparatus for pre-configuring a user equipment (UE) for a serving cell change is described. The apparatus may include a camping module configured to camp on a first cell. The apparatus may include a pre-configuration information module configured to receive at least one communication including target cell pre-configuration information for one or more neighbor cells eligible for pre-configuration. The camping module may be further configured to determine that the first cell is no longer providing adequate service. The pre-configuration information module may be further configured to identify a target cell that can provide adequate service. The target cell may be one of the one or more neighbor cells eligible for pre-configuration and is not part of an active set associated with the user equipment. The apparatus may include a serving cell change module configured to transmit a message requesting a serving cell change from the first cell to the target cell, configure to receive service from the target cell based on the pre-configuration information associated with the target cell, receive an indication to perform a serving cell change to the target cell, and perform the serving cell change to the target cell. The message may be an Event 1d message.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Release-8 of the 3rd Generation Partnership Project (3GPP) standards for Universal Mobile Telecommunications System (UMTS) includes an improved serving cell change operation referred to as enhanced serving cell change (E-SCC). E-SCC provides improved reliability (e.g., reduced call drops) and reduced interruption time for Voice-over-IP (VoIP) and circuit-switched over High Speed Packet Access (HSPA) serving cell changes in highly demanding radio environments. In this way, E-SCC provides for high-capacity voice-over-HSPA service in essentially all radio conditions.

Figure 1:
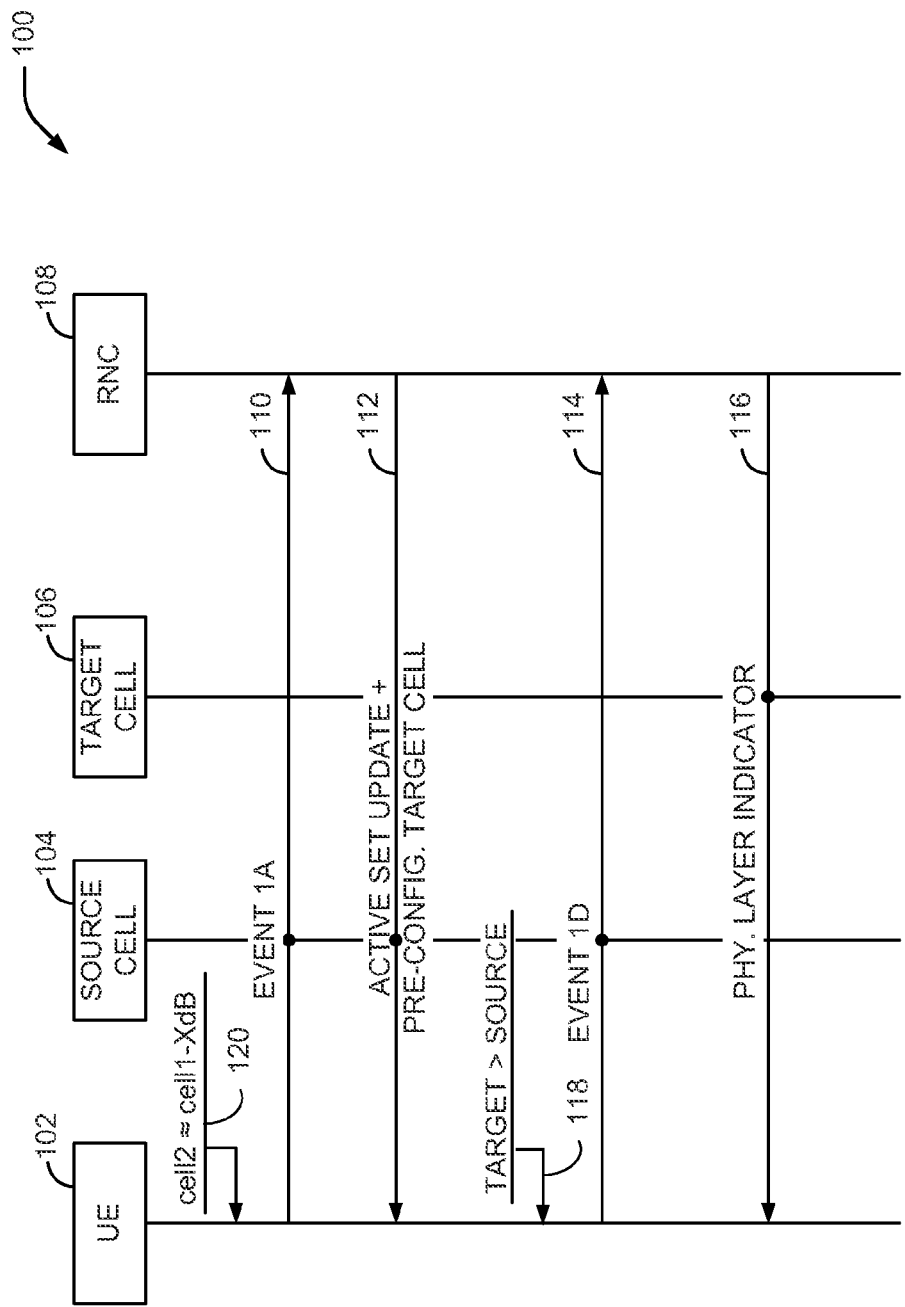
FIG. 1 is a call flow diagram illustrating an E-SCC operation according to 3GPP Release-8 Specifications.

Referring to FIG. 1, a call flow 100 illustrates a serving cell change (SCC) in a UMTS network implementing E-SCC as per Release-8 Specifications. In this example, at 120, when a cell neighboring a serving or source cell 104, such as, for example, target cell 106, has a pilot signal power that exceeds a certain threshold, a user equipment (UE) 102 may, at 110, provide a radio resource control (RRC) Measurement Report message indicating the increased signal strength of target cell 106. For example, UE 102 may determine that the pilot signal power of cell2 (e.g., target cell 106) is approximately equal to the pilot signal power of cell 1 (e.g., source cell 104) minus a certain signal power X in decibels (dB) (e.g., cell 2≈cell1−X db). Such a message may be referred to as notification of Event 1a (which is specifically described in the Release-8 or earlier 3GPP Specifications). A radio network controller (RNC) 108 may receive the event 1a notification and, in response at 112, send an RRC Active Set Update (ASU) message to UE 102. Here, in E-SCC as described by Release-8 Specifications, the RRC Active Set Update message includes pre-configuration information relating to the target cell 106, which the UE 102 may then store for utilization if the UE 102 performs a serving cell change to the target cell 106 such that it becomes the serving cell for that UE 102. This pre-configuration information, which the Release-8 Specifications refer to as a "target cell pre-configuration information" Information Element (IE) (also referred to as a target cell pre-configuration IE), may include a High Speed-Shared Control Channel (HS-SCCH) channelization code index corresponding to an HS-SCCH order transmitted by the target cell 106 among other information also included as part of the "target cell pre-configuration information" IE.

At 118, if, and when, the pilot signal power of the target cell 106 exceeds that of the source cell 104 by a certain configurable threshold (e.g., target>source 118), the UE 102 may configure its communication interface such that the target cell 106 may become its serving or source cell. As such, UE 102 may transmit, to RNC 108, a second RRC Measurement Report message, at 114, including an indication that the UE 102 is ready to switch from source cell 104 to target cell 106, which may be referred to as a notification of Event 1d (which is specifically described in the Release-8 Specifications). In response to the Measurement Report message, the RNC 108 may then instruct the target cell 106 to transmit, at 116, a physical (PHY) layer indication, which in one example may simply be a single bit of information, to instruct the UE 102 to change its serving cell from source cell 104 to the target cell 106. Because the RRC Active Set Update message already received by the UE 102 included information relating to the target cell 106, the UE 102 does not require any further transmissions and/or information (e.g., RRC messages) from the source cell 104 to complete the serving cell change to target cell 106. In this manner, E-SCC functions to improve a serving cell change from the source cell 104 to the target cell 106, reducing interruption time and improving reliability for the handing over of the HSPA channels.

In some cases, when a low-power cell such as a micro-cell, pico-cell, or femto-cell is deployed in close proximity to a high-power cell such as a macro-cell, or if a UE moves in either direction between the low-power cell and the high-power cell with a high enough speed, the E-SCC operation as it is defined in Release-8 Specifications, and as shown above with respect to FIG. 1, may fail, potentially leading to a call drop.

Figure 2:
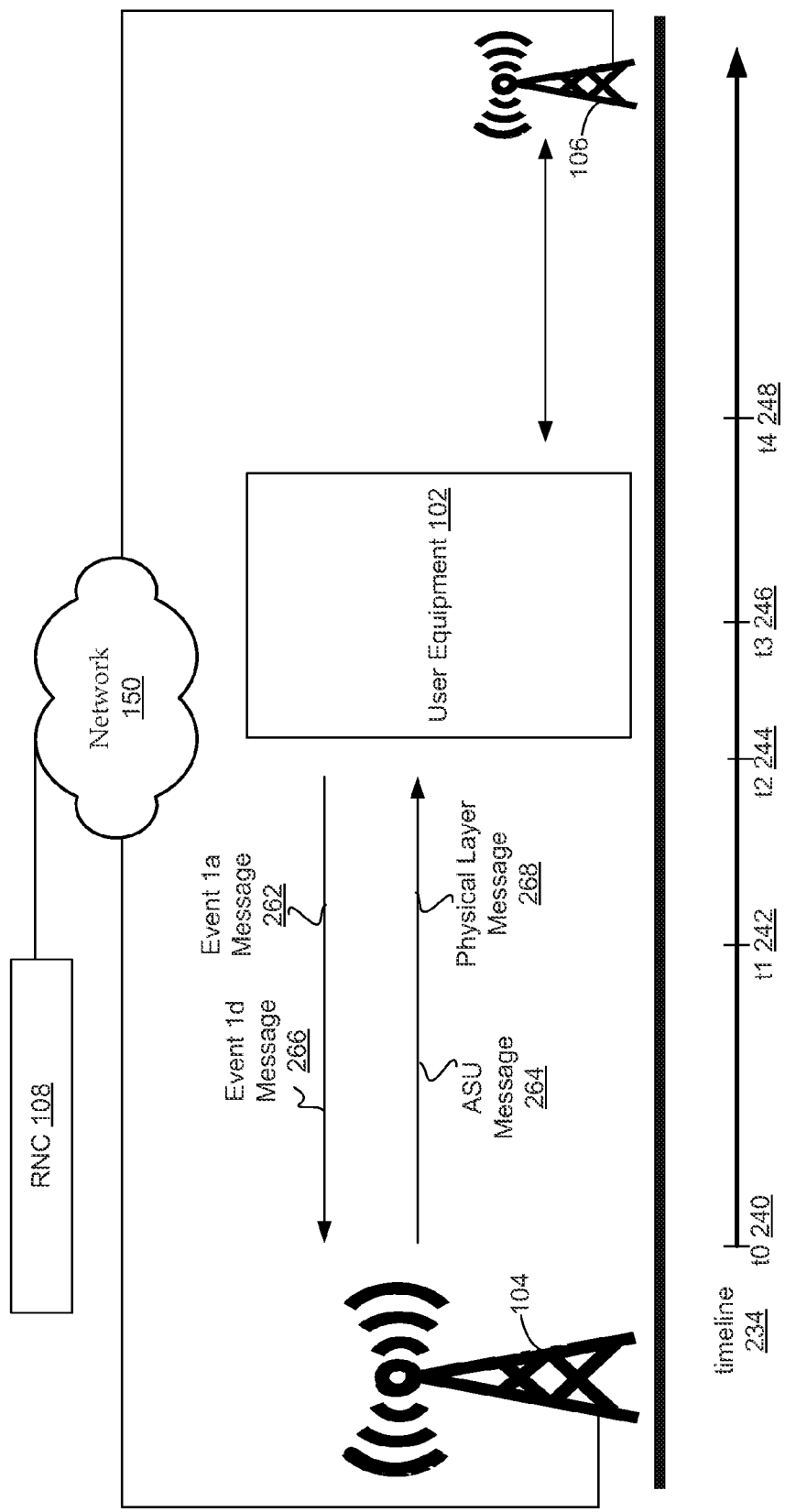
FIG. 2 is a diagram illustrating a user equipment (UE) moving in a heterogeneous network between a macro-cell and a pico-cell during an E-SCC operation according to the 3GPP Release-8 Specifications.

For example, FIG. 2 illustrates a timeline 234 of events that may take place as a UE 202 moves from the vicinity of a macro-cell 104 to the vicinity of a low-power node, such as a pico-cell 106, when the E-SCC operation according to the Release-8 Specifications occurs. In the below description, for example, the UE 102 is assumed to move away from the macro-cell 104 and toward the pico-cell 106 in each sequential time 240, 242, 244, 246, and 248, which are shown as various times on timeline 234. In an aspect, UE 102 may be UE 102 shown in FIG. 1, macro-cell 104 may be source cell 104 as shown in FIG. 1, pico-cell 106 may be target cell 106 as shown in FIG. 1, and RNC 108 may be RNC 108 as shown in FIG. 1. RNC 108 may be connected to UE 102 via the connection between the network 150 and either macro-cell 104 or pico-cell 106.

In some aspects, UE 102 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology.

At the start of timeline 234, e.g., at time t0 240, macro-cell 104 is the serving or source cell for UE 102. As UE 102 moves toward the pico-cell 106, at time t1 242, the UE 102 detects that the strength of a pilot signal transmitted by the pico-cell 106 exceeds a certain threshold (which may be communicated by the network 150, pre-configured, static, dynamic, determined by UE 102, and/or the like). In response, the UE 102 may report an Event 1a message 262 to the network 150 via its connection with macro-cell 104, to request the network to add the pico-cell 106 to an Active Set for the UE 102.

At time t2 244, the UE 102 may receive an active set update (ASU) message 264 from its current serving cell, e.g., macro-cell 104, which, according to E-SCC, includes pre-configuration information regarding the pico-cell 106 for future use by the UE 102 during a future serving cell change. For example, the ASU message 264 may include an HS-SCCH channelization code index corresponding to an HS-SCCH order transmitted by the pico-cell 106. As per the Release-8 Specifications, the pre-configuration information included in ASU message 264 is carried on an information element (IE) called the target cell pre-configuration information IE.

As the UE 102 continues to move toward the pico-cell 106, at time t3 246 the UE 102 may detect that the downlink received from the pico-cell 106 is the strongest among those received from all cells by the UE 102. In response to this condition, the UE 102 may report an Event 1d message 266 to the network 150 via its connection with macro-cell 104, requesting the network 150 to initiate a serving cell change to make the pico-cell 106 the serving cell for UE 102. At time t4 248, when the UE 102 receives the physical layer message 268 from the network 150, via macro-cell 104, indicating to undergo the serving cell change to the pico-cell 106, the UE 102 may utilize the target cell pre-configuration information included in the ASU message 264, corresponding to the pico-cell 106 in order to listen to HS-SCCH orders from the pico-cell 106. Once the HS-SCCH order is successfully decoded, the serving cell change is successful.

When considering the above-described E-SCC procedure, as per the 3GG Release-8 Specifications, it may be noted that the success of the serving cell change depends in part upon the successful reception by the UE 102 of the active set update (ASU) message 264. However, as discussed above, the ASU message 264 is transmitted to the UE 102 from its current serving cell, e.g., macro-cell 104. In a scenario where the serving cell strength (e.g., Ec/Io) is weak at the time the ASU message 264 is sent by the network 150 to the UE 102, the reception and decoding of the ASU message 264 can fail, and hence, the E-SCC may accordingly fail, since the target cell (e.g., pico-cell 106) pre-configuration information is not received successfully by the UE 102. Furthermore, with the above-described E-SCC procedure, the Event 1d message 266, which triggers the serving cell change, may only be sent for cells that are within the active set of the UE 102 as per current 3GPP Specifications. Thus, if the ASU message 264 fails to arrive at UE 102, as described above, the Event 1d cannot be triggered to initiate the serving cell change since pico-cell 106 has not been successfully added to the active set of UE 102.

Therefore, in accordance with the present aspects, the E-SCC procedure may be enhanced by removing the dependency of a successful serving cell change on the reception, by a UE, of an ASU message. In an aspect, a suitable mechanism may be utilized to pre-configure one or more specific target cells at a UE in advance of the transmission of an ASU message. In another aspect, an Event 1d message may be transmitted by the UE to request a serving cell change to a cell that is not included within the active set of the UE.

In a further aspect, the information conventionally carried on the target cell pre-configuration information IE (as part of an ASU message) may be transmitted to the UE at the time when the connection between the UE and the network is established. The target cell pre-configuration information may be provided for specific target cells, which may be selected and/or determined, based on the current serving cell for the UE. That is, a serving cell may include a set of target cells for which target cell pre-configuration information may be transmitted to the UE whether or not a particular cell among that set of target cells is in the active set of the UE. In this way, an Event 1d message may be transmitted by the UE to the network for any cell for which the pre-configuration information has been received. That is, although the E-SCC procedure as described in Release-8 Specifications limits the UE to transmitting an Event 1d message only for those cells in the active set of the UE, in accordance with the present aspects, the UE is not limited to sending an Event 1d only for those cells in its active set; rather, the UE may transmit an Event 1d to the network for any cell that has been pre-configured.

In an aspect, the target cell pre-configuration information may be transmitted to the UE as a part of one or more RRC messages (e.g., dedicated RRC messages) that are already being transmitted to the UE from the serving cell according to the normal course of operations. Such RRC messages may include, for example, a radio bearer setup message, a physical channel reconfiguration message, a transport channel reconfiguration message, a radio bearer reconfiguration message, or any suitable message that causes the UE to transition from any other state to a non-idle state (e.g., CELL Dedicated Channel (CELL_DCH) state).

In another aspect, the target cell pre-configuration information may be transmitted to the UE as part of a system information block (SIB) broadcast by a cell in the vicinity of the UE (e.g., the serving or source cell of the UE). Although any suitable SIB may be utilized within the scope of the present disclosure, in one example, the SIB11 broadcast may be used. For example, the SIB11 broadcasted from each cell typically includes a unique list of neighbors for that cell, including cell IDs. According to the present aspects, the cell IDs may be associated with, for example, a flag (e.g., a 1-bit flag) that represents whether each cell is eligible for advance pre-configuration. That is, if a flag corresponding to a particular cell ID in the SIB11 is set, the cell may be determined to be eligible for advance pre-configuration for a serving cell change to that cell.

Figure 3:
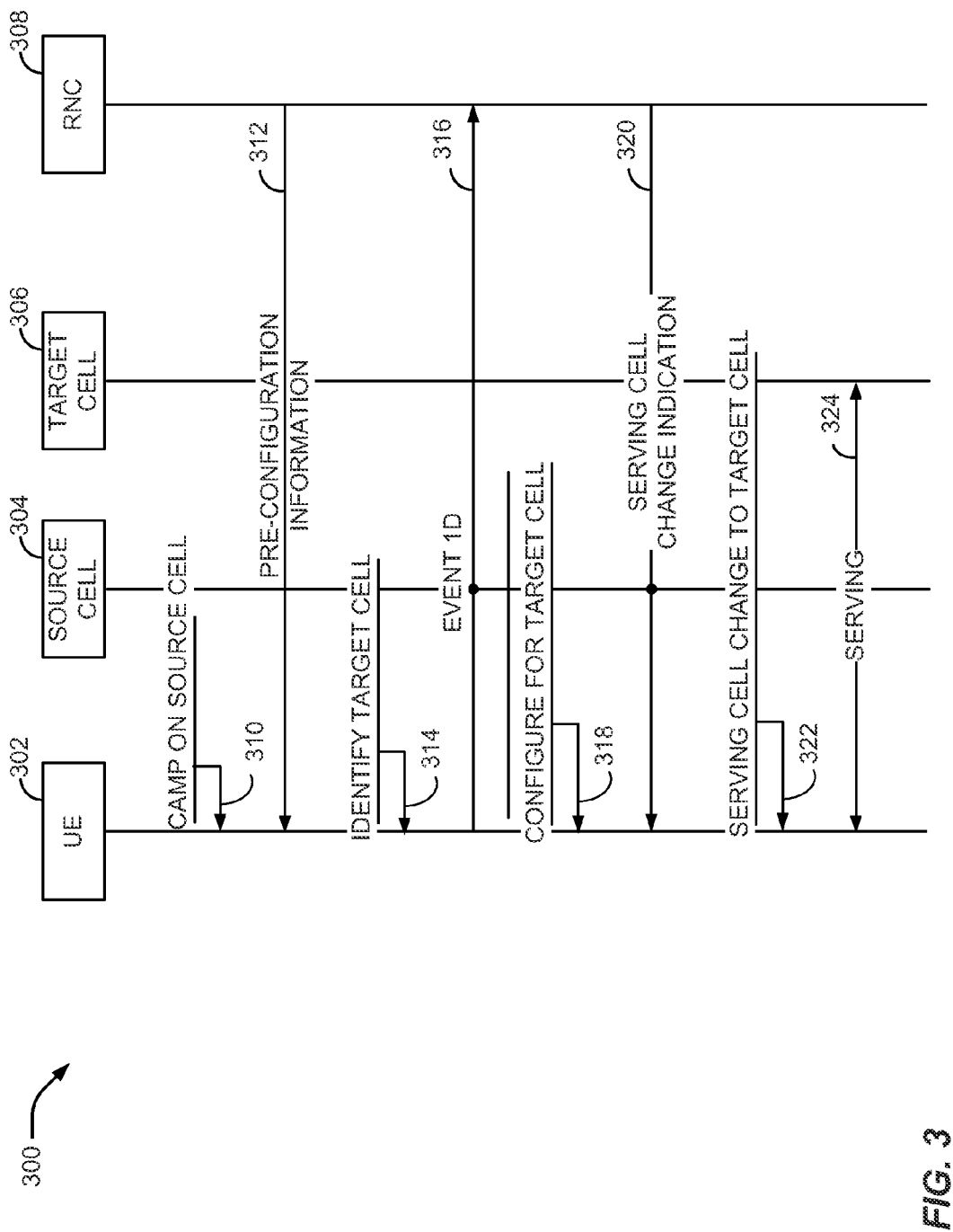
FIG. 3 is a call flow diagram illustrating a serving cell change of a UE from a source cell to a target cell according to the present aspects.

Referring to FIG. 3, a call flow 300 illustrates a serving cell change of a UE 302 from a source cell 304 to a target cell 306 according to the present aspects. More particularly, call flow 300 includes communications between a UE 302, source cell 304, target cell 306, and an RNC 308, which may be connected to the source cell 304 and target cell 306 via a network (not shown).

At 310, UE 302 camps on source cell 304. Some time thereafter, at 312, UE 302 receives pre-configuration information, which may include cell IDs for, and other information for communicating with, neighbor cells that are eligible for such pre-configuration. The pre-configuration information may be included in, in an aspect, one or more dedicated RRC messages and/or, in another aspect, one or more SIB broadcasts received by UE 302 from RNC 308 via the source cell 304.

After receiving the pre-configuration information, at 314, UE 302 may determine that target cell 306 (which may be included as one of the neighbors in the pre-configuration information) has a higher pilot signal power than the source cell 304. In an aspect, and for example, when target cell 306 is determined to have a higher pilot signal power than source cell 304, UE 302 also may determine that source cell 304 is no longer providing adequate service for UE 302 to successfully connect to the network via source cell 304. In response, UE 302 may determine if the identified target cell has been pre-configured based on the pre-configuration information sent at 312. Upon identifying the target cell, UE 302, at 316, may send an Event 1d message to the network, e.g., RNC 308. The Event 1d message may include information related to the identified target cell, e.g., a cell ID. In other words, the typical Event 1a and active set procedures may still occur, however, an ASU failure would not affect the ability of UE 3012 to send the Event 1d message for the identified target cell.

Once it sends the Event 1d message, UE 302 may, at 318, prepare for being served by target cell 306. UE 302 then waits for, and receives at 320, a serving cell change indication from RNC 308 that it may perform the serving cell change process from source cell 304 to target cell 306. UE 302 performs the serving cell change procedure at 322. Once the serving cell change is complete, at 324, the target cell 306 is now the serving or source cell for UE 302.

Figure 4:
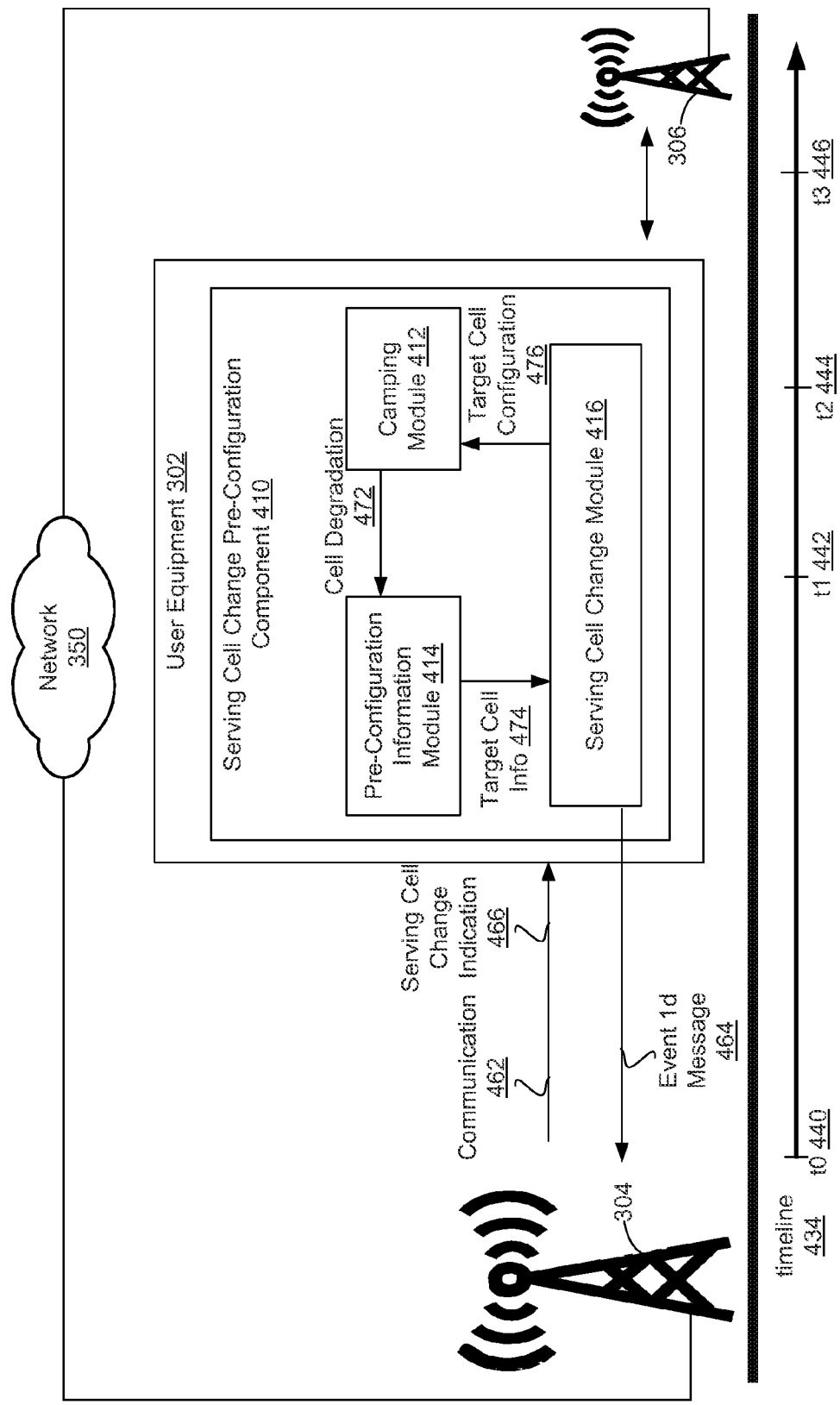
FIG. 4 is a diagram illustrating a UE moving in a heterogeneous network between a macro-cell and a pico-cell according to the present aspects.

Referring to FIG. 4, a timeline 434 of events that may take place as UE 302 (of FIG. 3) moves from the vicinity of a macro-cell 304 (e.g., source cell 304 of FIG. 3) to the vicinity of a low-power node such as a pico-cell 306 (e.g., target cell 306 of FIG. 3) according to the present aspects. Further, the network 350 of FIG. 4 may connect to RNC 308 of FIG. 3 (not shown in FIG. 4).

In the below description, for example, the UE 302 is assumed to move away from the macro-cell 304 and toward the pico-cell 306 in each sequential time 440, 442, 444, and 446, which are shown as various times on timeline 434. However, this example is non-limiting as UE 302 may move away from pico-cell 306 (which may, as such, be the serving or source cell for UE 302) towards macro-cell 304 (which may, as such, be a potential target cell), in sequential time periods.

UE 302 may include serving cell change pre-configuration component 410, which may be configured to handle all aspects of the serving cell change, e.g., from a higher-power node (e.g., macro-cell 304) to a lower-power node (e.g., pico-cell 306) and vice versa, where potential target cells, which may be referred to as neighbor cells, are preconfigured by the network 350, in anticipation of a serving cell change from a current serving or source cell (e.g., macro-cell 304) to one of the pre-configured neighbor cells (e.g., pico-cell 306).

Serving cell change pre-configuration component 410 may include camping module 412 configured to camp on a cell, e.g., macro-cell 304. As such, and in the present example of FIG. 4, at time t0 440, UE 302 may be camped on macro-cell 304.

Serving cell change pre-configuration component 410 may include pre-configuration information module 414 configured to receive a communication 462 from the current serving or source cell of UE 202, e.g., macro-cell 304. The communication 462 may include target cell pre-configuration information for one or more neighbor cells eligible for pre-configuration. The communication 462 may be sent by the serving cell, and arrive at UE 302, separately from, and most likely before, any ASU message. In an aspect, the communication 462 may be one or more dedicated RRC messages that include a target cell pre-configuration IE for neighbor cells eligible for advance configuration. The target cell pre-configuration IE may be included within one or more of the following types of dedicated RRC messages: a radio bearer setup message; a physical channel reconfiguration message; a transport channel reconfiguration message; a radio bearer reconfiguration message; or any suitable message that causes the UE to transition from any other state to a CELL_DCH state.

In another aspect, the communication 462 may be one or more system information block (SIB) broadcast by the serving cell (e.g., macro-cell 304). For example, the target cell pre-configuration information may be broadcasted by a cell (e.g., macro-cell 304) as part of an SIB transmission. Although any suitable SIB may be utilized within the scope of the present disclosure, in one example, the SIB11 broadcast may be utilized. For example, the SIB11 broadcasted from each cell typically includes a unique neighbor list for that cell. According to the present aspects, the neighbor cell list transmitted as part of SIB11 may include a cell ID for each of the named neighbor cells along with, for example, a corresponding flag (e.g., a 1-bit flag). For each cell ID where the flag is set, the associated neighbor cell is eligible for advance pre-configuration. That is, if a cell ID in the SIB11 broadcast has its corresponding flag set, the cell may be determined to be eligible for advance pre-configuration for an E-SCC procedure. In an aspect, the neighbor cell list (e.g., cell IDs) and corresponding flags, may be included in one SIB and the target cell pre-configuration information for the flagged cells may be included in another SIB.

In an aspect, pre-configuration information module 414 may be configured to receive SIB11 (e.g., communication 462) and determine which of the cells identified within SIB11 include the corresponding flag. In an aspect, the pre-configuration information module 414 may be configured to store, or otherwise save, the pre-configuration information for the neighbor cells that are eligible for the pre-configuration process and, in an aspect, discard the other information. Alternatively, and in an aspect, the pre-configuration information module 414 may be configured to store all of the information for all neighbor cells included within SIB 11, but maintain a separate list of those cells having pre-configuration information as indicated by the flags.

In the present example of FIG. 4, when the macro-cell 304 is the serving cell for the UE 302, the macro-cell 304 may transmit the SIB11 (e.g., communication 462), which includes a neighbor list. The neighbor list may include the pico-cell 306 (even if, for example, pico-cell 306 is not included within an active list of UE 302). The entry in the neighbor list corresponding to the pico-cell 306 may include a corresponding flag indicating that the pico-cell 306 is eligible for advance pre-configuration. Of course, one or more other cells in addition to the pico-cell may be eligible for advance pre-configuration, as indicated by correspondingly flagged entries in the neighbor list.

Pre-configuration information module 414 may store (in, for example, a data store, memory, or the like) the pre-configuration information received via communication 462. The pre-configuration information may include information that instructs and allows UE 302 to perform a serving cell change from a current serving cell (e.g., macro-cell 304) to one of the pre-configured neighbor cells, as well as information for UE 302 to be served by the pre-configured neighbor cells, included in the communication 462.

Camping module 412 also may be configured to determine if, and when, a current serving cell is no longer providing adequate service to the UE 302 because, for example, the radio frequency (RF) scenario between the UE 302 and the serving cell has degraded, there is increased interference from, e.g., a neighbor cell, the UE 302 has moved too far away from the serving cell, and/or the like. In an aspect, camping module 412 may do so by, for example, determining if, and when, pilot signal quality (e.g., Ec/Io) of some other cell (e.g., pico-cell 306) exceeds that of the current serving cell (e.g., macro-cell 304). For example, at time t1 442, camping module 412 may determine that macro-cell 304 is no longer providing adequate service to UE 302 because, for example, the pilot signal quality of pico-cell 306 is greater than the pilot signal quality of macro-cell 304. In response, camping module 412 may be configured to generate and send a cell degradation indication 472 to pre-configuration information module 414. In an aspect, for example, the cell degradation indication 472 may include an identifier (e.g., cell ID) for the cell (e.g., pico-cell 306) having the detected signal quality higher than the current serving cell (e.g., macro-cell 304). In response to receiving the cell degradation indication 472, pre-configuration information module 414 may determine if the identified cell that can provide adequate service has been pre-configured based on the pre-configuration information received in communication 462. If so, the pre-configuration information module 414 may determine that the identified cell is a potential target cell.

Upon identifying the potential target cell, which may be, in the example of FIG. 4, pico-cell 306, pre-configuration information module 414 may communicate information related to the identified target cell 474 to serving cell change module 416, which may also be included within serving cell change pre-configuration component 410. The identified target cell 474 information may include, for example, an identifier associated with the target cell (e.g., cell ID) and the pre-configuration information, which was received in communication 462, for the target cell. In response, serving cell change module 416 may be configured to generate a message requesting a serving cell change from the current serving cell (e.g., macro-cell 304) to the identified target cell (e.g., pico-cell 306). The message may be, for example, an Event 1d message. The Event 1d message 464 may be sent from UE 302 to the network 350 (via macro-cell 304). According to the present aspects, even if the pico-cell 306 is not included in an active set for UE 302, the UE 302 may still generate and send an Event 1 d message 464.

Upon generating the Event 1d, serving cell change module 416 also may be configured to prepare (e.g., configure) UE 302 to begin receiving service from the identified target cell (e.g., pico-cell 306) based on the pre-configuration information associated with the target cell included in communication 462, and provided to serving cell change module 416 as part of identified target cell 474 information. Serving cell change module 416 may provide target cell configuration information 476 to camping module 412 in order to prepare for handing over from the current serving cell (e.g., macro-cell 304) to the identified target cell (e.g., pico-cell 306) and being served by the target cell (e.g., pico-cell 306).

In response to receiving the Event 1d message 464 from UE 302, the network 450 may provide an indication that UE 302 may serving cell change from the serving cell (e.g., macro-cell 304) to the target cell identified in the Event 1d message 464 (e.g., pico-cell 306). In an aspect, serving cell change module 416 may receive the serving cell change indication 466 and, in response, complete the serving cell change procedure accordingly. However, since the radio frequency (RF) scenario between UE 302 and macro-cell 304 is difficult (e.g., UE 302 is amid a serving cell change procedure), and likely degrading, the UE 302 may receive the serving cell change indication 466 from any cell with which UE 302 can be in communication. As such, and in the example of FIG. 4, at time t3 446, UE 302 is being served by pico-cell 306.

Figure 5:
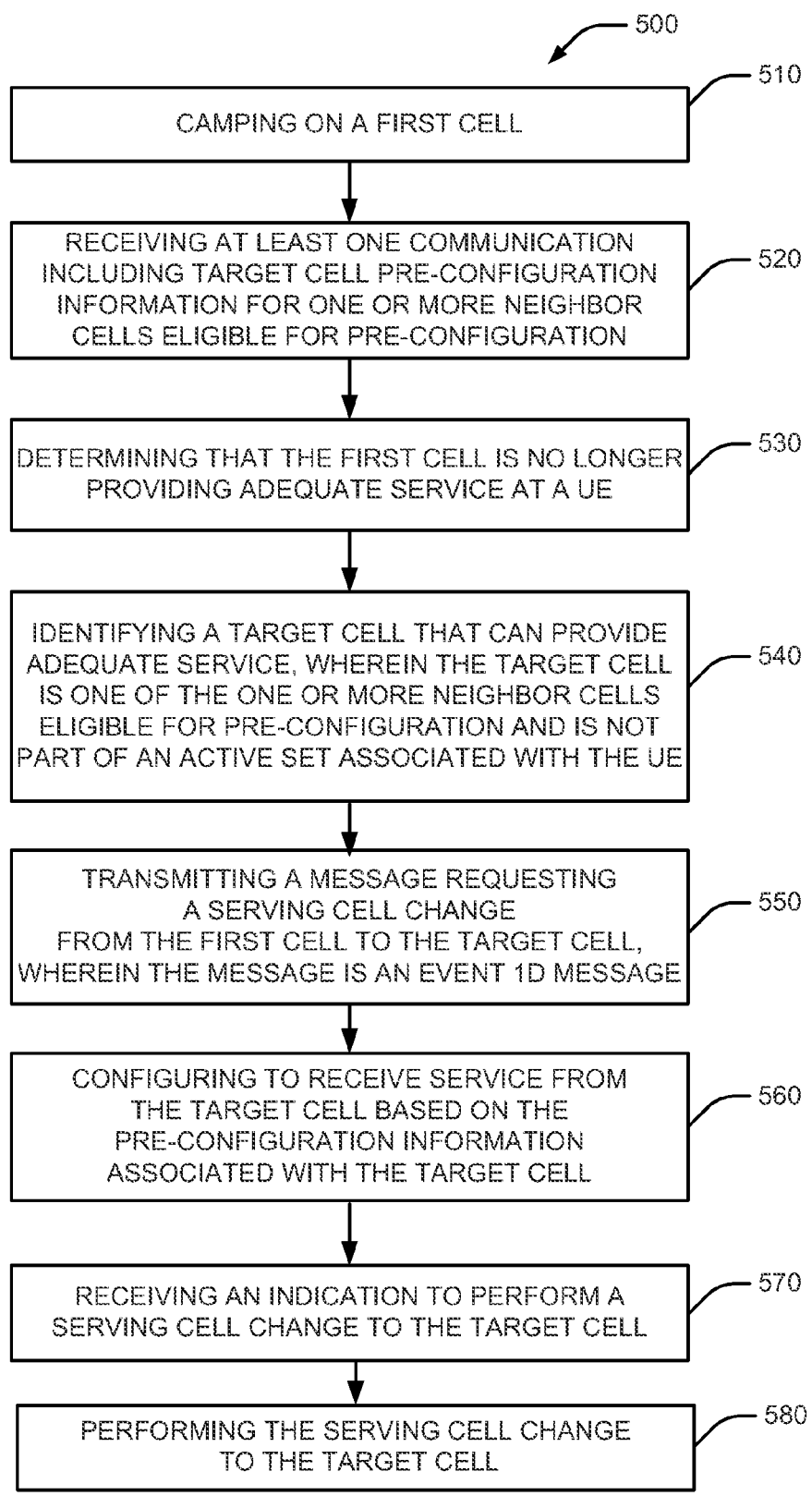
FIG. 5 is a flow chart of a method of pre-configuring a UE for a serving cell change to a neighbor cell according to the present aspects.

Referring to FIG. 5, a method 500 for pre-configuring for a serving cell change to neighbor cells may be performed by UE 302 of FIGS. 3 and 4 according to the present aspects. More particularly, aspects of method 500 may be performed by serving cell change pre-configuration component 410, pre-configuration information module 414, camping module 412, and/or serving cell change module 416 of FIG. 4.

At 510, the method 500 includes camping on a first cell. For example, camping module 412 may be configured to camp on macro-cell 304.

At 520, the method 500 receiving at least one communication including target cell pre-configuration information for one or more neighbor cells eligible for pre-configuration. For example, UE 302, at pre-configuration information module 414, may receive communication 462 from macro-cell 304 (e.g., the current serving cell), which includes target cell pre-configuration information for one or more neighbor cells, including pico-cell 306, eligible for pre-configuration. In an aspect, pre-configuration information module 414 may be configured to store the pre-configuration information included in communication 462.

In an aspect the at least one communication comprises a dedicated radio resource control (RRC) message, which may be at least one of a radio bearer setup message, a physical channel reconfiguration message, a transport channel reconfiguration message, a radio bearer reconfiguration message, and a message for transitioning the UE from a state other than a CELL_DCH state, to the CELL_DCH state.

In another aspect, the at least one communication comprises one or more system information blocks (SIB), such that the one or more SIBs include a list of neighbor cells and flags corresponding to the neighbor cells eligible for pre-configuration, along with the target cell pre-configuration information.

At 530, the method 500 includes determining that the first cell is no longer providing adequate service. For example, camping module 412 may be configured to determine that a pilot signal quality for pico-cell 306 is greater than the pilot signal quality for macro-cell 304, and, as such, the macro-cell 304 is no longer providing adequate service. In response, camping module 412 may be configured to communicate a cell degradation indication 472 to pre-configuration information module 414.

At 540, the method 500 includes identifying a target cell that can provide adequate service, wherein the target cell is one of the one or more neighbor cells eligible for pre-configuration and is not part of an active set associated with the user equipment. For example, pre-configuration information module 414 may receive cell degradation indication 472 from camping module 412 identifying a target cell (e.g., pico-cell 306) that can provide adequate service. Pre-configuration information module 414 may be configured to determine if the identified target cell (e.g., pico-cell 306) was pre-configured based on the pre-configuration information received in communication 462. The target cell (e.g., pico-cell 306) may be determined to be one of the neighbor cells in the neighbor list, which is eligible for pre-configuration. The target cell (e.g., pico-cell 306) need not be in an active set for UE 302. Pre-configuration information module 414 may be configured to provide identified target cell 474 information, which includes an identifier (e.g., cell ID) associated with pico-cell 306 and pre-configuration information for pico-cell 306, to serving cell change module 416.

At 550, the method 500 includes transmitting a message requesting a serving cell change from the first cell to the target cell, wherein the message is an Event 1d message. For example, in response to receiving identified target cell 474 information from pre-configuration information module 414, serving cell change module 416 may be configured to generate, and transmit to the network 350, an Event 1d message 464 requesting a serving cell change from macro-cell 304 to pico-cell 306.

At 560, the method 500 includes configuring to receive service from the target cell based on the pre-configuration information associated with the target cell. For example, after sending the Event 1d message 464, serving cell change module 416 may be configured to send target cell configuration information 476 to camping module 412 to prepare UE 302 to perform serving cell change to, and be served by, pico-cell 306.

At 570, the method 500 includes receiving an indication to perform a serving cell change to the target cell. For example, UE 302, at serving cell change module 416, may receive serving cell change indication 466 from the network via, for example, macro-cell 304. However, since the radio frequency (RF) scenario between UE 302 and macro-cell 304 is difficult (e.g., UE 302 is amid a serving cell change procedure), and likely degrading, the UE 302 may receive the serving cell change indication 466 from any cell with which UE 302 can be in communication.

At 580, the method 500 includes performing the serving cell change to the target cell. For example, serving cell change module 416 may be configured, in response to receiving serving cell change indication 466, to change the serving cell of UE 302, based on the pre-configuration information included in target cell configuration information 476, from macro-cell 304 to pico-cell 306.

Figure 6:
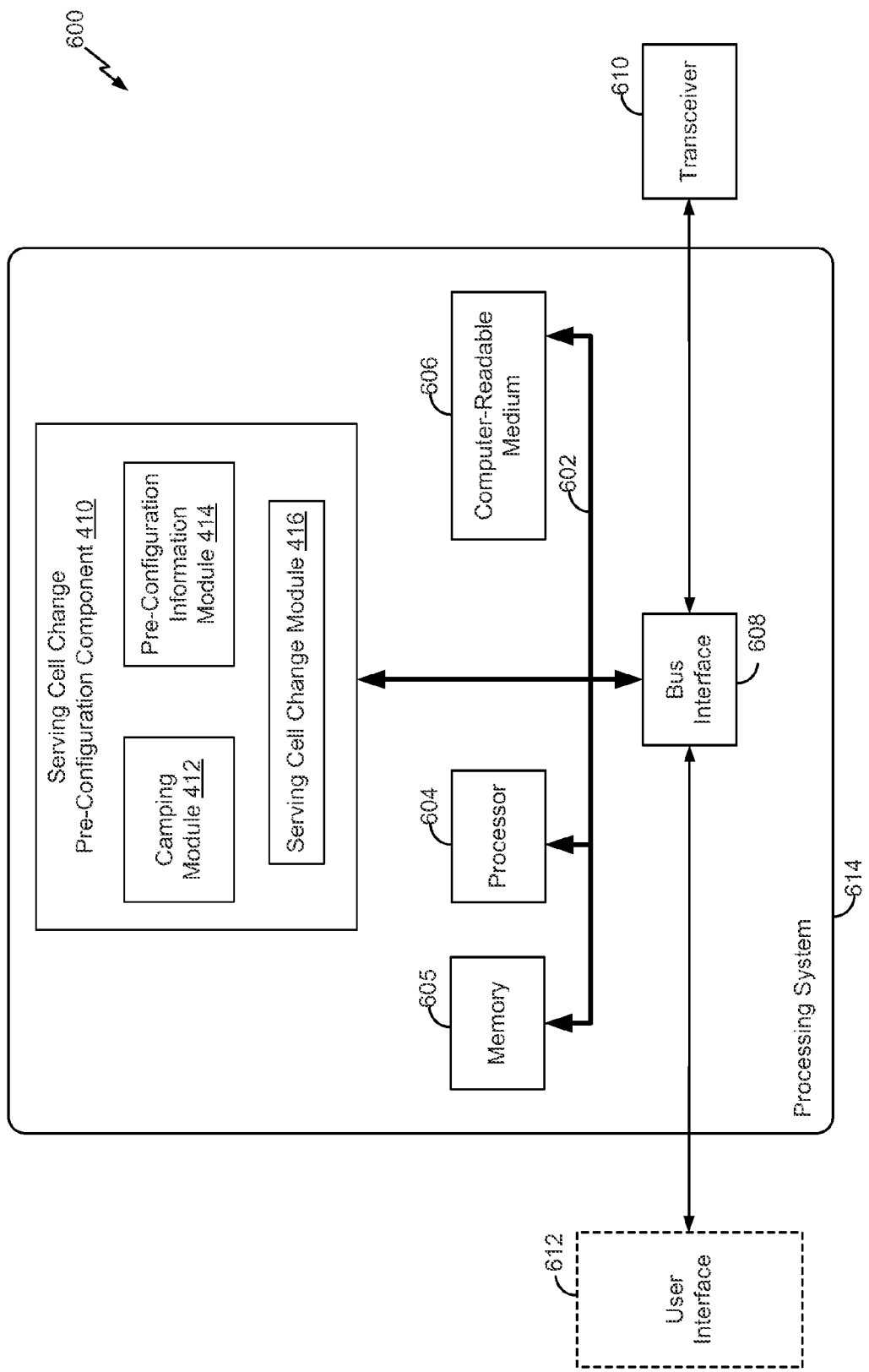
FIG. 6 is a diagram illustrating an example of a hardware implementation for an apparatus employing a processing system, including aspects for pre-configuring for a serving cell change to neighbor cells.

FIG. 6 is a diagram illustrating an example of a hardware implementation for an apparatus 600 employing a processing system 614 having aspects for pre-configuring for a serving cell change to neighbor cells. In some examples, the apparatus 600 may be a UE configured for wireless communication in a cellular wireless communication network, such as, for example, UE 302 of FIGS. 3 and 4. In accordance with various aspects of the disclosure, an element, or any portion of an element, or any combination of elements may be implemented with a processing system 614 that includes one or more processors 604. Examples of processors 604 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure.

In this example, the processing system 614 may be implemented with a bus architecture, represented generally by the bus 602. The bus 602 may include any number of interconnecting buses and bridges depending on the specific application of the processing system 614 and the overall design constraints. The bus 602 links together various circuits including one or more processors (represented generally by the processor 604), a memory 605, and computer-readable media (represented generally by the computer-readable medium 606). The bus also may link serving cell change pre-configuration component 410, including camping module 412, pre-configuration information module 414, and serving cell change module 416, of FIG. 4, to memory 605, processor 604, and computer-readable medium 606. In an aspect, rather than being a separate entity, serving cell change pre-configuration component 410 may be implemented by processor 604 operating in conjunction with memory 605 and/or computer-readable medium 606.

The bus 602 may also link various other circuits such as timing sources, peripherals, voltage regulators, and power management circuits, which are well known in the art, and therefore, will not be described any further. A bus interface 608 provides an interface between the bus 602 and a transceiver 610. The transceiver 610 provides a means for communicating with various other apparatus over a transmission medium. Depending upon the nature of the apparatus, a user interface 612 (e.g., keypad, display, speaker, microphone, joystick) may also be provided.

The processor 604 is responsible for managing the bus 602 and general processing, including the execution of software stored on the computer-readable medium 606. The software, when executed by the processor 604, causes the processing system 614 to perform the various functions described herein as related to pre-configuring for a serving cell change to neighbor cells for any particular apparatus. The computer-readable medium 606 may also be used for storing data that is manipulated by the processor 604 when executing software.

One or more processors 604 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 606. The computer-readable medium 606 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 606 may reside in the processing system 614, external to the processing system 614, or distributed across multiple entities including the processing system 614. The computer-readable medium 606 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

Figure 7:
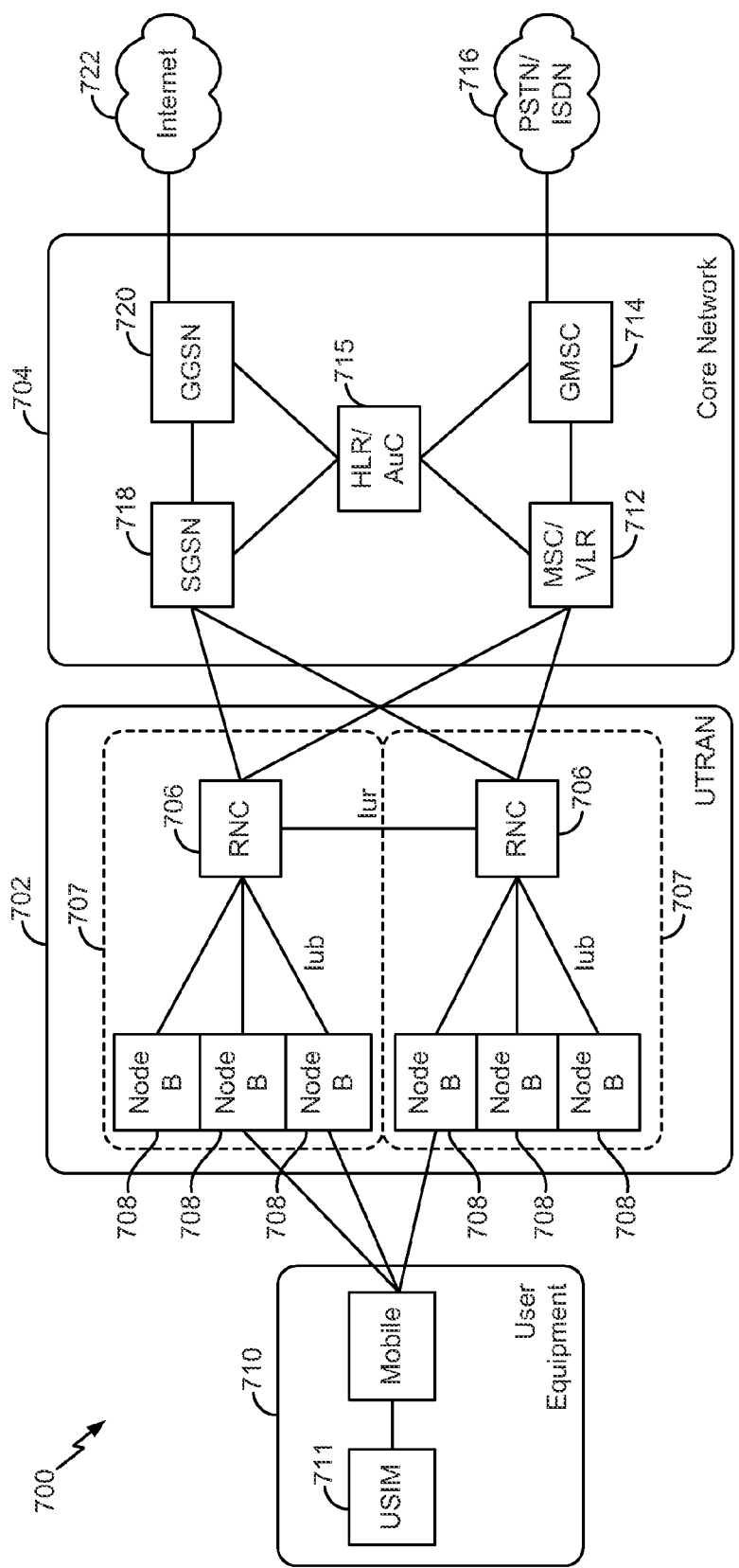
FIG. 7 is a diagram illustrating an example of a telecommunications system, including aspects for pre-configuring for a serving cell change to neighbor cells.

The various concepts presented throughout this disclosure may be implemented across a broad variety of telecommunication systems, network architectures, and communication standards. Referring now to FIG. 7, as an illustrative example without limitation, various aspects of the present disclosure are illustrated with reference to a Universal Mobile Telecommunications System (UMTS) system 700 having aspects configured for pre-configuring for a serving cell change to neighbor cells. A UMTS network includes three interacting domains: a core network 704, a radio access network (RAN) (e.g., the UMTS Terrestrial Radio Access Network (UTRAN) 702), and a user equipment (UE) 710. UE 720 may be, for example, UE 302 of FIGS. 3 and 4. Among several options available for a UTRAN 702, in this example, the illustrated UTRAN 702 may employ a W-CDMA air interface for enabling various wireless services including telephony, video, data, messaging, broadcasts, and/or other services. The UTRAN 702 may include a plurality of Radio Network Subsystems (RNSs) such as an RNS 707, each controlled by a respective Radio Network Controller (RNC) such as an RNC 706, which may be, for example, RNC 308 of FIG. 3. Here, the UTRAN 702 may include any number of RNCs 706 and RNSs 707 in addition to the illustrated RNCs 706 and RNSs 707. The RNC 706 is an apparatus responsible for, among other things, assigning, reconfiguring, and releasing radio resources within the RNS 707. The RNC 706 may be interconnected to other RNCs (not shown) in the UTRAN 702 through various types of interfaces such as a direct physical connection, a virtual network, or the like using any suitable transport network.

The geographic region covered by the RNS 707 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 708 are shown in each RNS 707; however, the RNSs 707 may include any number of wireless Node Bs. The Node Bs 708, which may be macro-cell 304 and/or pico-cell 306 of FIGS. 3 and 4, provide wireless access points to a core network 704 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. In a UMTS system, the UE 710 may further include a universal subscriber identity module (USIM) 711, which contains a user's subscription information to a network. For illustrative purposes, one UE 710 is shown in communication with a number of the Node Bs 708. The downlink (DL), also called the forward link, refers to the communication link from a Node B 708 to a UE 710 and the uplink (UL), also called the reverse link, refers to the communication link from a UE 710 to a Node B 708.

The core network 704 can interface with one or more access networks, such as the UTRAN 702. As shown, the core network 704 is a UMTS core network. However, as those skilled in the art will recognize, the various concepts presented throughout this disclosure may be implemented in a RAN, or other suitable access network, to provide UEs with access to types of core networks other than UMTS networks.

The illustrated UMTS core network 704 includes a circuit-switched (CS) domain and a packet-switched (PS) domain. Some of the circuit-switched elements are a Mobile services Switching Centre (MSC), a Visitor Location Register (VLR), and a Gateway MSC (GMSC). Packet-switched elements include a Serving GPRS Support Node (SGSN) and a Gateway GPRS Support Node (GGSN). Some network elements, like EIR, HLR, VLR, and AuC may be shared by both of the circuit-switched and packet-switched domains.

In the illustrated example, the core network 704 supports circuit-switched services with a MSC 712 and a GMSC 714. In some applications, the GMSC 714 may be referred to as a media gateway (MGW). One or more RNCs, such as the RNC 706, may be connected to the MSC 712. The MSC 712 is an apparatus that controls call setup, call routing, and UE mobility functions. The MSC 712 also includes a visitor location register (VLR) that contains subscriber-related information for the duration that a UE is in the coverage area of the MSC 712. The GMSC 714 provides a gateway through the MSC 712 for the UE to access a circuit-switched network 716. The GMSC 714 includes a home location register (HLR) 715 containing subscriber data, such as the data reflecting the details of the services to which a particular user has subscribed. The HLR is also associated with an authentication center (AuC) that contains subscriber-specific authentication data. When a call is received for a particular UE, the GMSC 714 queries the HLR 715 to determine the UE's location and forwards the call to the particular MSC serving that location.

The illustrated core network 704 also supports packet-switched data services with a serving GPRS support node (SGSN) 718 and a gateway GPRS support node (GGSN) 720. General Packet Radio Service (GPRS) is designed to provide packet-data services at speeds higher than those available with standard circuit-switched data services. The GGSN 720 provides a connection for the UTRAN 702 to a packet-based network 722. The packet-based network 722 may be the Internet, a private data network, or some other suitable packet-based network. The primary function of the GGSN 720 is to provide the UEs 710 with packet-based network connectivity. Data packets may be transferred between the GGSN 720 and the UEs 710 through the SGSN 718, which performs primarily the same functions in the packet-based domain as the MSC 712 performs in the circuit-switched domain.

Figure 8:
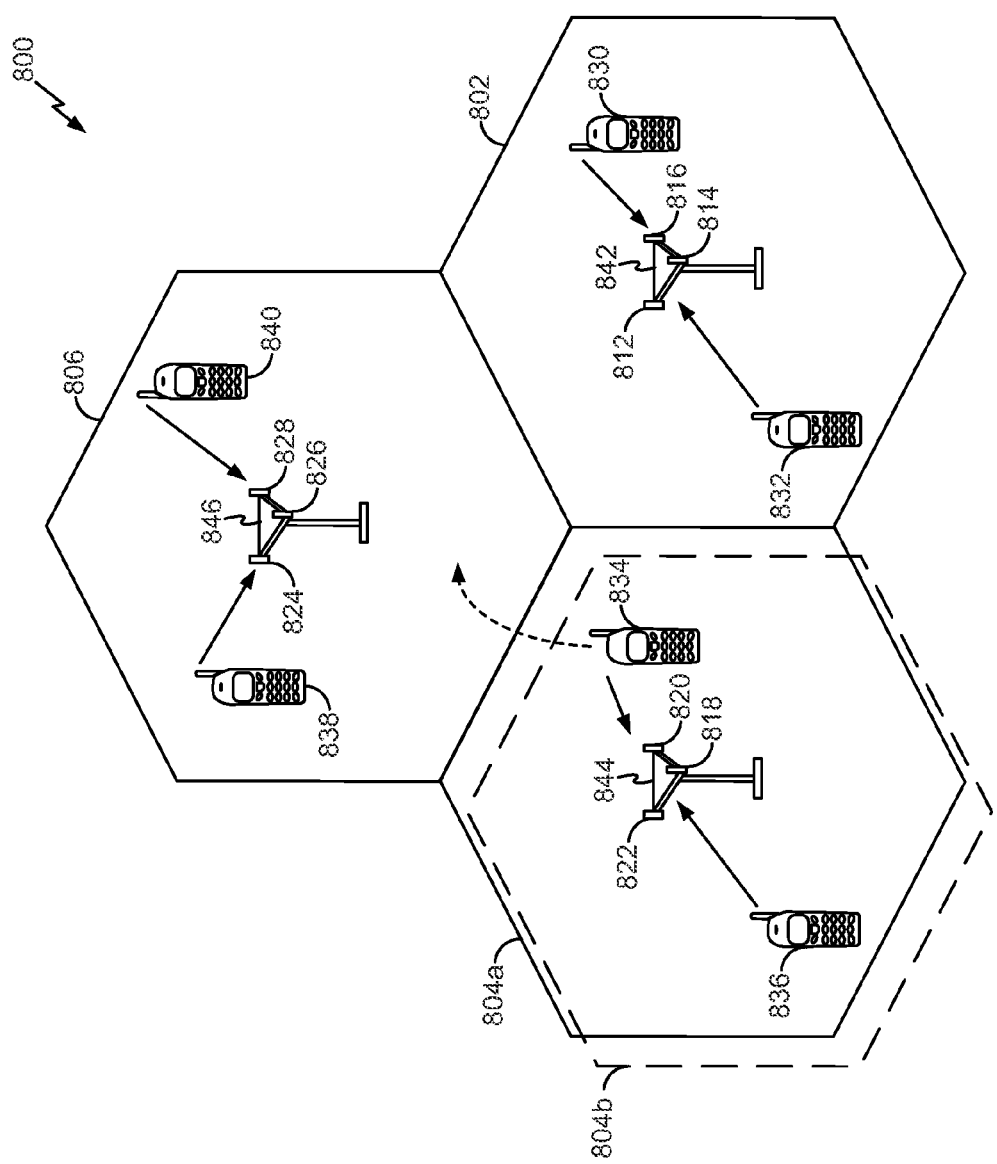
FIG. 8 is a diagram illustrating an example of an access network, including aspects for pre-configuring for a serving cell change to neighbor cells.

The UTRAN 702 is one example of a RAN that may be utilized in accordance with the present disclosure. Referring to FIG. 8, by way of example and without limitation, a simplified schematic illustration of a RAN 800 in a UTRAN architecture is illustrated. The system includes multiple cellular regions (cells), including cells 802, 804, and 806, each of which may include one or more sectors. Cells may be defined geographically (e.g., by coverage area) and/or may be defined in accordance with a frequency, scrambling code, etc. That is, the illustrated geographically-defined cells 802, 804, and 806 may each be further divided into a plurality of cells, e.g., by utilizing different scrambling codes. For example, cell 804a may utilize a first scrambling code, and cell 804b, while in the same geographic region and served by the same Node B 844, which may be macro-cell 304 and/or pico-cell 306 of FIGS. 3 and 4, may be distinguished by utilizing a second scrambling code.

In a cell that is divided into sectors, the multiple sectors within a cell can be formed by groups of antennas with each antenna responsible for communication with UEs in a portion of the cell. For example, in cell 802, antenna groups 812, 814, and 816 may each correspond to a different sector. In cell 804, antenna groups 818, 820, and 822 may each correspond to a different sector. In cell 806, antenna groups 824, 826, and 828 may each correspond to a different sector.

The cells 802, 804, and 806 may include several UEs that may be in communication with one or more sectors of each cell 802, 804, or 806. For example, UEs 830 and 832 may be in communication with Node B 842, UEs 834 and 836 may be in communication with Node B 844, and UEs 838 and 840 may be in communication with Node B 846. Here, each Node B 842, 844, and 846 may be configured to provide an access point to a core network 704 (see FIG. 7) for all the UEs 830, 832, 834, 836, 838, and 840 in the respective cells 802, 804, and 806. UEs 830, 832, 834, 836, 838, and 840 may be, for example, UE 302 of FIGS. 3 and 4.

During a call with a source cell, or at any other time, the UE 836 may monitor various parameters of the source cell as well as various parameters of neighboring cells. Further, depending on the quality of these parameters, the UE 836 may maintain communication with one or more of the neighboring cells. During this time, the UE 836 may maintain an Active Set, that is, a list of cells to which the UE 836 is simultaneously connected (i.e., the UTRAN cells that are currently assigning a downlink dedicated physical channel DPCH or fractional downlink dedicated physical channel F-DPCH to the UE 836 may constitute the Active Set).

The UTRAN air interface may be a spread spectrum Direct-Sequence Code Division Multiple Access (DS-CDMA) system, such as one utilizing the W-CDMA standards. The spread spectrum DS-CDMA spreads user data through multiplication by a sequence of pseudorandom bits called chips. The W-CDMA air interface for the UTRAN 702 is based on such DS-CDMA technology and additionally calls for a frequency division duplexing (FDD). FDD uses a different carrier frequency for the uplink (UL) and downlink (DL) between a Node B and a UE. Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles are equally applicable to a TD-SCDMA air interface or any other suitable air interface.

A high speed packet access (HSPA) air interface includes a series of enhancements to the 3G/W-CDMA air interface between the UE 710 and the UTRAN 702, facilitating greater throughput and reduced latency for users. Among other modifications over prior standards, HSPA utilizes hybrid automatic repeat request (HARQ), shared channel transmission, and adaptive modulation and coding. The standards that define HSPA include HSDPA (high speed downlink packet access) and HSUPA (high speed uplink packet access, also referred to as enhanced uplink or EUL).

One difference on the downlink between Release-5 HSDPA and the previously standardized circuit-switched air-interface is the absence of soft handover in HSDPA. This means that HSDPA channels are transmitted to the UE from a single cell called the HSDPA serving cell. As the user moves, or as one cell becomes preferable to another, the HSDPA serving cell may change. Still, the UE may be in soft handover on the associated DPCH, receiving the same information from plural cells.

In Release 5 HSDPA, at any instance a UE 710 has one serving cell: the strongest cell in the active set as according to the UE measurements of Ec/Io. According to mobility procedures defined in Release 5 of 3GPP TS 25.331, the radio resource control (RRC) signaling messages for changing the HSPDA serving cell are transmitted from the current HSDPA serving cell (i.e., the source cell) and not the cell that the UE reports as being the stronger cell (i.e., the target cell).

In a wireless telecommunication system, the communication protocol architecture may take on various forms depending on the particular application. For example, in a 3GPP UMTS system, the signaling protocol stack is divided into a Non-Access Stratum (NAS) and an Access Stratum (AS). The NAS provides the upper layers, for signaling between the UE 710 and the core network 704 (referring to FIG. 7), and may include circuit switched and packet switched protocols. The AS provides the lower layers, for signaling between the UTRAN 702 and the UE 710, and may include a user plane and a control plane. Here, the user plane or data plane carries user traffic, while the control plane carries control information (i.e., signaling).

Figure 9:
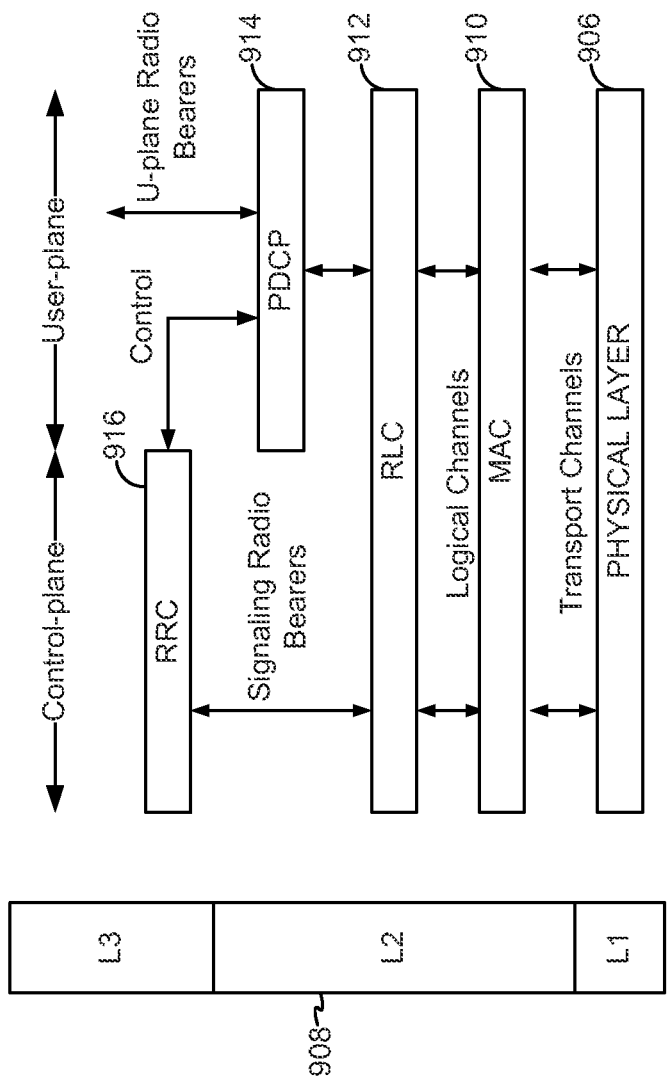
FIG. 9 is a diagram illustrating an example of a radio protocol architecture for user and control planes.

Turning to FIG. 9, the AS is shown with three layers: Layer 1, Layer 2, and Layer 3. Layer 1 is the lowest layer and implements various physical layer signal processing functions. Layer 1 will be referred to herein as the physical layer 906. The data link layer, called Layer 2 908, is above the physical layer 906 and is responsible for the link between a UE, such as, for example, UE 302 of FIGS. 3 and 4, and a base station or Node B, such as, for example, macro-cell 304 and/or pico-cell 306 of FIGS. 3 and 4, over the physical layer 906.

At Layer 3, the RRC layer 916 handles the control plane signaling between the UE and the Node B. RRC layer 916 includes a number of functional entities for routing higher layer messages, handling broadcasting and paging functions, establishing and configuring radio bearers, etc.

In the illustrated air interface, the L2 layer 908 is split into sublayers. In the control plane, the L2 layer 908 includes two sublayers: a medium access control (MAC) sublayer 910 and a radio link control (RLC) sublayer 912. In the user plane, the L2 layer 908 additionally includes a packet data convergence protocol (PDCP) sublayer 914. Although not shown, the UE may have several upper layers above the L2 layer 908 including a network layer (e.g., IP layer) that is terminated at a PDN gateway on the network side and an application layer that is terminated at the other end of the connection (e.g., far end UE, server, etc.).

The PDCP sublayer 914 provides multiplexing between different radio bearers and logical channels. The PDCP sublayer 914 also provides header compression for upper layer data packets to reduce radio transmission overhead, security by ciphering the data packets, and handover support for UEs between Node Bs.

The RLC sublayer 912 generally supports an acknowledged mode (AM) (where an acknowledgment and retransmission process may be used for error correction), an unacknowledged mode (UM), and a transparent mode for data transfers, and provides segmentation and reassembly of upper layer data packets and reordering of data packets to compensate for out-of-order reception due to a hybrid automatic repeat request (HARQ) at the MAC layer. In the acknowledged mode, RLC peer entities such as an RNC and a UE may exchange various RLC protocol data units (PDUs) including RLC Data PDUs, RLC Status PDUs, and RLC Reset PDUs, among others. In the present disclosure, the term "packet" may refer to any RLC PDU exchanged between RLC peer entities.

The MAC sublayer 910 provides multiplexing between logical and transport channels. The MAC sublayer 910 is also responsible for allocating the various radio resources (e.g., resource blocks) in one cell among the UEs. The MAC sublayer 910 is also responsible for HARQ operations.

Figure 10:
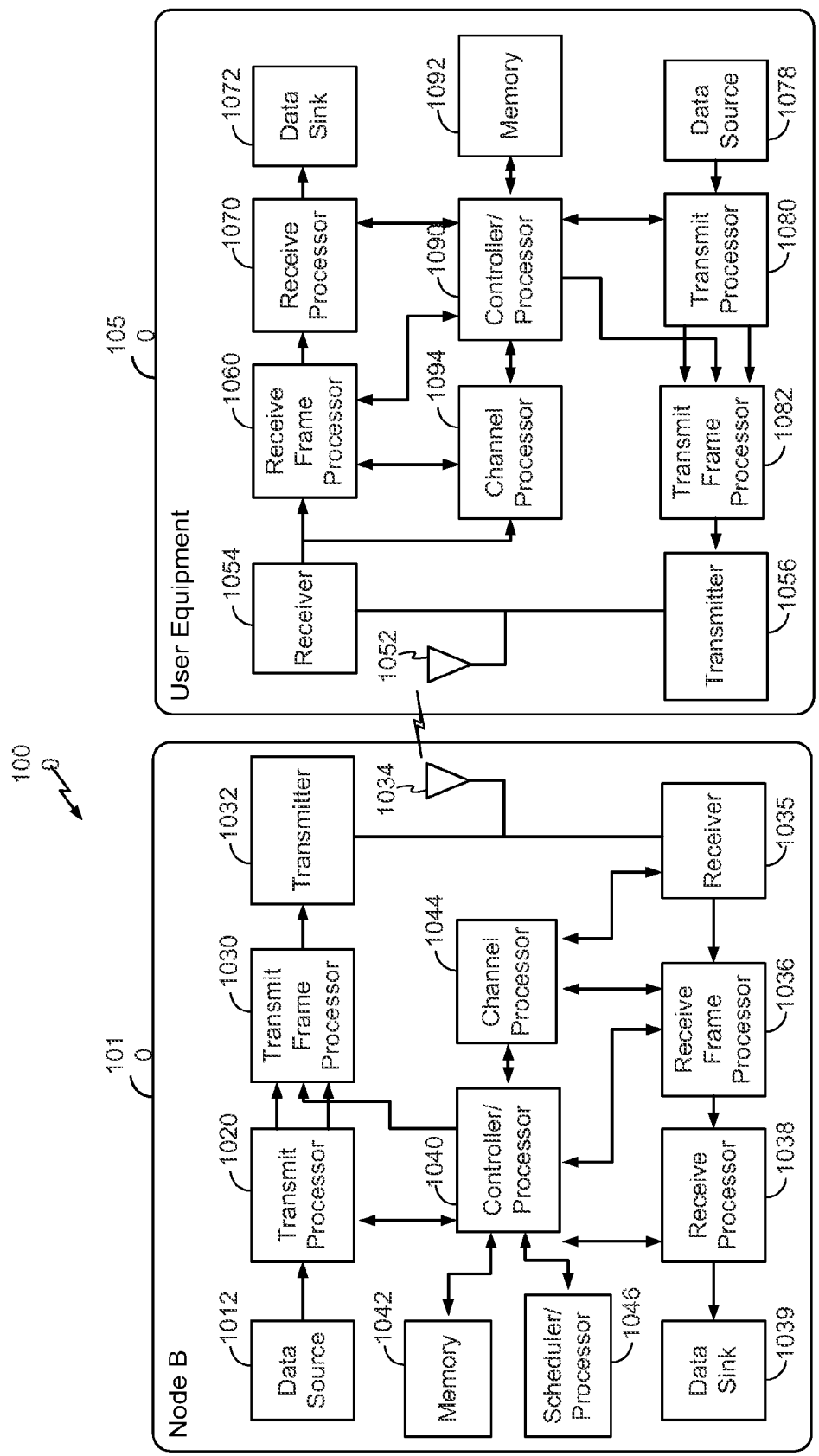
FIG. 10 is a diagram illustrating an example of a Node B in communication with a UE in a telecommunications system, including aspects for pre-configuring for a serving cell change to neighbor cells.

FIG. 10 is a block diagram of an exemplary Node B 1010 in communication with an exemplary UE 1050 having aspects for pre-configuring for a serving cell change to neighbor cells. The Node B 1010 may be macro-cell 304 and/or pico-cell 306 of FIGS. 3 and 4, and the UE 1050 may be the UE 302 of FIGS. 3 and 4. In the downlink communication, a transmit processor 1020 may receive data from a data source 1012 and control signals from a controller/processor 1040. The transmit processor 1020 provides various signal processing functions for the data and control signals, as well as reference signals (e.g., pilot signals). For example, the transmit processor 1020 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 1044 may be used by a controller/processor 1040 to determine the coding, modulation, spreading, and/or scrambling schemes for the transmit processor 1020. These channel estimates may be derived from a reference signal transmitted by the UE 1050 or from feedback from the UE 1050. The symbols generated by the transmit processor 1020 are provided to a transmit frame processor 1030 to create a frame structure. The transmit frame processor 1030 creates this frame structure by multiplexing the symbols with information from the controller/processor 1040, resulting in a series of frames. The frames are then provided to a transmitter 1032, which provides various signal conditioning functions including amplifying, filtering, and modulating the frames onto a carrier for downlink transmission over the wireless medium through antenna 1034. The antenna 1034 may include one or more antennas, for example, including beam steering bidirectional adaptive antenna arrays or other similar beam technologies.

At the UE 1050, a receiver 1054 receives the downlink transmission through an antenna 1052 and processes the transmission to recover the information modulated onto the carrier. The information recovered by the receiver 1054 is provided to a receive frame processor 1060, which parses each frame, and provides information from the frames to a channel processor 1094 and the data, control, and reference signals to a receive processor 1070. The receive processor 1070 then performs the inverse of the processing performed by the transmit processor 1020 in the Node B 1010. More specifically, the receive processor 1070 descrambles and despreads the symbols, and then determines the most likely signal constellation points transmitted by the Node B 1010 based on the modulation scheme. These soft decisions may be based on channel estimates computed by the channel processor 1094. The soft decisions are then decoded and deinterleaved to recover the data, control, and reference signals. The CRC codes are then checked to determine whether the frames were successfully decoded. The data carried by the successfully decoded frames will then be provided to a data sink 1072, which represents applications running in the UE 1050 and/or various user interfaces (e.g., display). Control signals carried by successfully decoded frames will be provided to a controller/processor 1090. When frames are unsuccessfully decoded by the receiver processor 1070, the controller/processor 1090 may also use an acknowledgement (ACK) and/or negative acknowledgement (NACK) protocol to support retransmission requests for those frames.

In the uplink, data from a data source 1078 and control signals from the controller/processor 1090 are provided to a transmit processor 1080. The data source 1078 may represent applications running in the UE 1050 and various user interfaces (e.g., keyboard). Similar to the functionality described in connection with the downlink transmission by the Node B 1010, the transmit processor 1080 provides various signal processing functions including CRC codes, coding and interleaving to facilitate FEC, mapping to signal constellations, spreading with OVSFs, and scrambling to produce a series of symbols. Channel estimates, derived by the channel processor 1094 from a reference signal transmitted by the Node B 1010 or from feedback contained in the midamble transmitted by the Node B 1010, may be used to select the appropriate coding, modulation, spreading, and/or scrambling schemes. The symbols produced by the transmit processor 1080 will be provided to a transmit frame processor 1082 to create a frame structure. The transmit frame processor 1082 creates this frame structure by multiplexing the symbols with information from the controller/processor 1090, resulting in a series of frames. The frames are then provided to a transmitter 1056, which provides various signal conditioning functions including amplification, filtering, and modulating the frames onto a carrier for uplink transmission over the wireless medium through the antenna 1052.

The uplink transmission is processed at the Node B 1010 in a manner similar to that described in connection with the receiver function at the UE 1050. A receiver 1035 receives the uplink transmission through the antenna 1034 and processes the transmission to recover the information modulated onto the carrier. The information recovered by the receiver 1035 is provided to a receive frame processor 1036, which parses each frame, and provides information from the frames to the channel processor 1044 and the data, control, and reference signals to a receive processor 1038. The receive processor 1038 performs the inverse of the processing performed by the transmit processor 1080 in the UE 1050. The data and control signals carried by the successfully decoded frames may then be provided to a data sink 1039 and the controller/processor, respectively. If some of the frames were unsuccessfully decoded by the receive processor, the controller/processor 1040 may also use an acknowledgement (ACK) and/or negative acknowledgement (NACK) protocol to support retransmission requests for those frames.

The controller/processors 1040 and 1090 may be used to direct the operation at the Node B 1010 and the UE 1050, respectively. For example, the controller/processors 1040 and 1090 may provide various functions including timing, peripheral interfaces, voltage regulation, power management, and other control functions. The computer readable media of memories 1042 and 1092 may store data and software for the Node B 1010 and the UE 1050, respectively. A scheduler/processor 1046 at the Node B 1010 may be used to allocate resources to the UEs and schedule downlink and/or uplink transmissions for the UEs.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and TS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM□, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

The invention claimed is:

1. A method of pre-configuring a user equipment (UE) for a serving cell change, comprising:
    camping on a first cell;
    receiving, by the UE, at least one communication including target cell pre-configuration information for one or more neighbor cells eligible for pre-configuration that are not part of an active set associated with the user equipment, wherein a first system information block (SIB) includes a list of neighbor cells and flags corresponding to the neighbor cells eligible for pre-configuration, and a second SIB includes the target cell pre-configuration information;
    determining that the first cell is no longer providing adequate service;
    identifying a target cell that can provide adequate service, wherein the target cell is one of the one or more neighbor cells eligible for pre-configuration;
    transmitting a message requesting a serving cell change from the first cell to the target cell, wherein the message is an Event 1d message;
    configuring, in response to the transmitting the Event 1d message, to receive service from the target cell based on the pre-configuration information associated with the target cell that is not part of the active set associated with the user equipment;
    receiving, from the target cell that is not part of the active set associated with the user equipment, an indication to perform a serving cell change to the target cell; and
    performing the serving cell change to the target cell.

2. The method of claim 1, wherein the at least one communication comprises a dedicated radio resource control (RRC) message.

3. The method of claim 1, wherein the at least one communication is at least one of a radio bearer setup message, a physical channel reconfiguration message, a transport channel reconfiguration message, a radio bearer reconfiguration message, or a message for transitioning the UE from a state other than a CELL_DCH state, to the CELL_DCH state.

4. The method of claim 1, wherein the Event 1d message can be transmitted even though the target cell is not part of the active set associated with the user equipment.

5. The method of claim 1, wherein the pre-configuration information associated with the target cell is included in a "Target Cell Pre-configuration Information" information element (IE) as described in 3GPP Release-8 Specifications.

6. The method of claim 1, wherein determining that the first cell is no longer providing adequate service comprises determining at least one of the following: that the radio frequency (RF) scenario between the user equipment and the first cell has degraded, that there is increased interference from one or more cells neighboring the first cell, that the user equipment is located too far away from the serving cell, or that a pilot signal quality associated with the first cell is lower than a pilot signal quality for the target cell.

7. The method of claim 1, wherein identifying a target cell that can provide adequate service comprises identifying a cell having a higher pilot signal quality than a pilot signal quality of the first cell.

8. The method of claim 1, wherein the target cell being eligible for pre-configuration comprises the target cell being included in a set of target cells for which target cell pre-configuration information is provided.

9. The method of claim 8, wherein the target cell being eligible for pre-configuration comprises the target cell being included in a set of target cells based on the camping on the first cell.

10. A non-transitory computer-readable medium storing computer executable code for pre-configuring a user equipment (UE) for a serving cell change, comprising:
code for causing a computer to:
camp on a first cell;
receive at least one communication including target cell pre-configuration information for one or more neighbor cells eligible for pre-configuration that are not part of an active set associated with the user equipment, wherein a first system information block (SIB) includes a list of neighbor cells and flags corresponding to the neighbor cells eligible for pre-configuration, and a second SIB includes the target cell pre-configuration information;
determine that the first cell is no longer providing adequate service;
identify a target cell that can provide adequate service, wherein the target cell is one of the one or more neighbor cells eligible for pre-configuration;
transmit a message requesting a serving cell change from the first cell to the target cell, wherein the message is an Event 1d message;
configure to receive service from the target cell based on the pre-configuration information associated with the target cell;
receive an indication to perform a serving cell change to the target cell; and
perform the serving cell change to the target cell.

11. An apparatus for pre-configuring a user equipment (UE) for a serving cell change, comprising:
means for camping on a first cell;
means for receiving at least one communication including target cell pre-configuration information for one or more neighbor cells eligible for pre-configuration that are not part of an active set associated with the user equipment, wherein a first system information block (SIB) includes a list of neighbor cells and flags corresponding to the neighbor cells eligible for pre-configuration, and a second SIB includes the target cell pre-configuration information;
means for determining that the first cell is no longer providing adequate service;
means for identifying a target cell that can provide adequate service, wherein the target cell is one of the one or more neighbor cells eligible for pre-configuration;
means for transmitting a message requesting a serving cell change from the first cell to the target cell, wherein the message is an Event 1d message;
means for configuring to receive service from the target cell based on the pre-configuration information associated with the target cell;
means for receiving an indication to perform a serving cell change to the target cell; and
means for performing the serving cell change to the target cell.

12. An apparatus for pre-configuring a user equipment (UE) for a serving cell change, comprising:
a transceiver;
at least one processor configured to:
camp on a first cell,
receive via the transceiver at least one communication including target cell pre-configuration information for one or more neighbor cells eligible for pre-configuration that are not part of an active set associated with the user equipment, wherein a first system information block (SIB) includes a list of neighbor cells and flags corresponding to the neighbor cells eligible for pre-configuration, and a second SIB includes the target cell pre-configuration information,
determine that the first cell is no longer providing adequate service,
identify a target cell that can provide adequate service, wherein the target cell is one of the one or more neighbor cells eligible for pre-configuration,
transmit a message requesting a serving cell change from the first cell to the target cell, wherein the message is an Event 1d message,
configure the UE to receive service from the target cell based on the pre-configuration information associated with the target cell,
receive via the transceiver an indication to perform a serving cell change to the target cell, and
perform the serving cell change to the target cell; and
a memory coupled to the at least one processor.

13. The apparatus of claim 12, wherein the at least one communication comprises a dedicated radio resource control (RRC) message.

14. The apparatus of claim 12, wherein the at least one communication is at least one of a radio bearer setup message, a physical channel reconfiguration message, a transport channel reconfiguration message, a radio bearer reconfiguration message, or a message for transitioning the UE from a state other than a CELL_DCH state, to the CELL_DCH state.

15. The apparatus of claim 12, wherein the Event 1d message can be transmitted even though the target cell is not part of the active set associated with the user equipment.

16. The apparatus of claim 12, wherein the pre-configuration information associated with the target cell is included in a "Target Cell Pre-configuration Information" information element (IE) as described in 3GPP Release-8 Specifications.

17. The method of claim 1, wherein the configuring is in response to the transmitting the Event 1d message for the target cell that is not part of the active set associated with the user equipment.

* * * * *